(12) United States Patent
Armstrong

(10) Patent No.: US 10,716,263 B2
(45) Date of Patent: Jul. 21, 2020

(54) CONSTRUCTION APPARATUS AND METHOD FOR AGRICULTURAL GROWING STRUCTURE

(71) Applicant: Danny A. Armstrong, Payson, AZ (US)

(72) Inventor: Danny A. Armstrong, Payson, AZ (US)

( * ) Notice: Subject to any disclaimer, the term of this patent is extended or adjusted under 35 U.S.C. 154(b) by 84 days.

(21) Appl. No.: 16/181,305

(22) Filed: Nov. 5, 2018

(65) Prior Publication Data

US 2019/0183064 A1    Jun. 20, 2019

Related U.S. Application Data

(63) Continuation-in-part of application No. 15/162,590, filed on May 23, 2016, now Pat. No. 10,117,389.

(51) Int. Cl.
| | | |
|---|---|---|
| A01G 9/02 | (2018.01) |
| B66F 7/06 | (2006.01) |
| B29C 48/25 | (2019.01) |
| B29C 48/09 | (2019.01) |
| B29C 48/12 | (2019.01) |
| B29C 48/025 | (2019.01) |
| B29C 48/03 | (2019.01) |
| B29C 48/265 | (2019.01) |
| B29L 31/00 | (2006.01) |

(52) U.S. Cl.
CPC .......... *A01G 9/023* (2013.01); *B29C 48/0255* (2019.02); *B29C 48/09* (2019.02); *B29C 48/12* (2019.02); *B29C 48/131* (2019.02); *B29C 48/2528* (2019.02); *B29C 48/265* (2019.02); *B29C 48/266* (2019.02); *B66F 7/0666* (2013.01); *B29L 2031/7004* (2013.01)

(58) Field of Classification Search
CPC ....... A01G 9/023; A01G 9/022; B66F 7/0666; B29L 2031/7004; B29L 2031/70; B29C 48/2528; B29C 48/266; B29C 48/09
See application file for complete search history.

(56) References Cited

U.S. PATENT DOCUMENTS

| | | | | |
|---|---|---|---|---|
| 7,080,482 B1* | 7/2006 | Bradley | ................. | A01G 31/02 47/60 |
| 8,740,191 B2* | 6/2014 | Litcher | ..................... | B66F 3/22 254/122 |
| 8,919,735 B2* | 12/2014 | Rosenboom | .......... | B66F 11/042 254/93 R |
| 9,422,142 B2* | 8/2016 | Bacon | .................... | B66F 7/0658 |
| 9,828,221 B2* | 11/2017 | Mohr | ...................... | B66F 7/065 |
| 2008/0224107 A1* | 9/2008 | Polins | ....................... | B66B 9/16 254/45 |
| 2015/0173303 A1* | 6/2015 | Leavitt | ..................... | A01G 9/02 47/66.7 |
| 2019/0183075 A1* | 6/2019 | Armstrong | ............. | A01G 31/04 |

* cited by examiner

*Primary Examiner* — Trinh T Nguyen
(74) *Attorney, Agent, or Firm* — Roy A. Ekstrand

(57) ABSTRACT

A plurality of trough extruders are supported upon a lift truck traveling in a circular travel path. The plurality of trough extruders continuously form one piece troughs as the lift truck travels its circular path. A lift mechanism progressively raises the extruders as the lift truck travels its circular path two form continuous one-piece helical water troughs for use in an agricultural growing structure.

2 Claims, 6 Drawing Sheets

CONSTRUCTION APPARATUS AND METHOD FOR AGRICULTURAL GROWING STRUCTURE

CROSS-REFERENCE TO RELATED APPLICATION

This application is a Continuation-in-Part of co-pending application Ser. No. 15/162,590 filed May 23, 2016 in the name of Danny A. Armstrong and entitled AGRICULTURAL GROWING STRUCTURE, the disclosure of which is incorporated herein by reference, which application claims the benefit of and priority under 35 U.S.C. 119(e) of U.S. Provisional Patent Application No. 62/165,947, filed May 23, 2015 on behalf of Danny A. Armstrong and entitled AGRICULTURAL GROWING STRUCTURE, the disclosure of which is incorporated herein by reference. This application is further related to a simultaneously filed and co-pending application filed Nov. 5, 2018 in the name of Danny A. Armstrong and entitled AGRICULTURAL GROWING STRUCTURE, the disclosure of which is incorporated herein by reference,

FIELD OF THE INVENTION

This invention relates generally to agricultural systems such as hydroponic growing systems and particularly to methods of construction used therein.

BACKGROUND OF THE INVENTION

Traditional agriculture has, for centuries, been carried forward on plots of land, typically referred to as "farms". Farms have been utilized in a virtually endless variety of climates, geographical locales, sizes and circumstances. As populations increased and non-farming land use increased, reduced amounts of agricultural land have been available. In many areas of the world, this reduction of available land for farming has become critical. As the competition for land between agricultural food producers and non-agricultural land users has intensified, agricultural food producers have struggled to supply food to ever increasing populations using less and less land. This pressure has lead many food producers to explore non-tradition methods of farming. One promising alternative to traditional farming methods is found in hydroponics. Hydroponics is basically a system of agriculture which involves growing plants in a water and nutrient mixture without the use of soil. While a number of different hydroponic systems have been developed, typically all utilize an absorbent growing medium that supports seeds and growing plants such that the plant roots extend into a nutrient-rich water solution.

While hydroponic systems were received initially as bearing great promise, development of efficient cost-effective and practical agriculture has eluded practitioners in the agricultural arts. Hydroponic systems have, for the most part, proven to be costly and complex structures that still require substantially the same extensive land areas as traditional farming. In addition, the complex structures required to grow large crops in a manner that is cost competitive with traditional farming has not been attained. There remains therefore a continuing and unresolved need in the art for a system of agriculture that effectively and efficiently addresses the critical shortage of farm land throughout the world. There remains a continuing and unresolved need in the agricultural arts for a system of agriculture that is capable of growing greater crops for a given area of land.

Construction of hydroponic agricultural systems has, for the most part, proven to difficult and expensive. The fabrication of hydroponic agricultural systems has focus primarily upon expensive space-consuming apparatus.

SUMMARY OF THE INVENTION

Accordingly, it is a general object of the present invention to provide an improved construction apparatus and method for agricultural growing structure. It is a more particular object of the present invention to provide an improved construction apparatus and method for agricultural growing structure which fabricates and agricultural growing system upon virtually any site utilizing methods and apparatus that require a minimum of support resources.

In accordance with the present invention, there is provided apparatus for forming a plurality of one-piece helical growing troughs for use in an agricultural growing structure, the apparatus comprising: a self-propelled lift truck capable of traveling a circular path; a scissors lift supported upon the lift truck configurable in a collapsed configuration and an upwardly extended raised configuration; a frame supported upon the scissors lift having an outwardly extending platform; and a plurality of trough extruders each forming a one piece extruded trough, the lift truck traveling in a circular path as the trough extruders extrude continuous one-piece extruded troughs and the scissors lift progressively raising the frame, said platform and the extruders to impart a helical shape to the extruded one piece troughs thus formed. From another perspective, the present invention also provides a method of forming a helical agricultural growing structure having a plurality of concentric helical growing troughs, the method comprising the steps of: providing a self-propelled lift truck capable of traveling a circular path; providing a scissors lift supported upon the lift truck configurable in a collapsed configuration and an upwardly extended raised configuration; providing a frame supported upon the scissors lift having an outwardly extending platform; providing a plurality of trough extruders each forming a one piece extruded trough; moving the lift truck in a circular path as the trough extruders extrude continuous one-piece extruded troughs; and extending the scissors lift progressively raising the frame, the platform and the extruders as the lift truck travels in the circular path to impart a helical shape to the extruded one piece troughs thus formed.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS OF THE INVENTION

Figure 1:
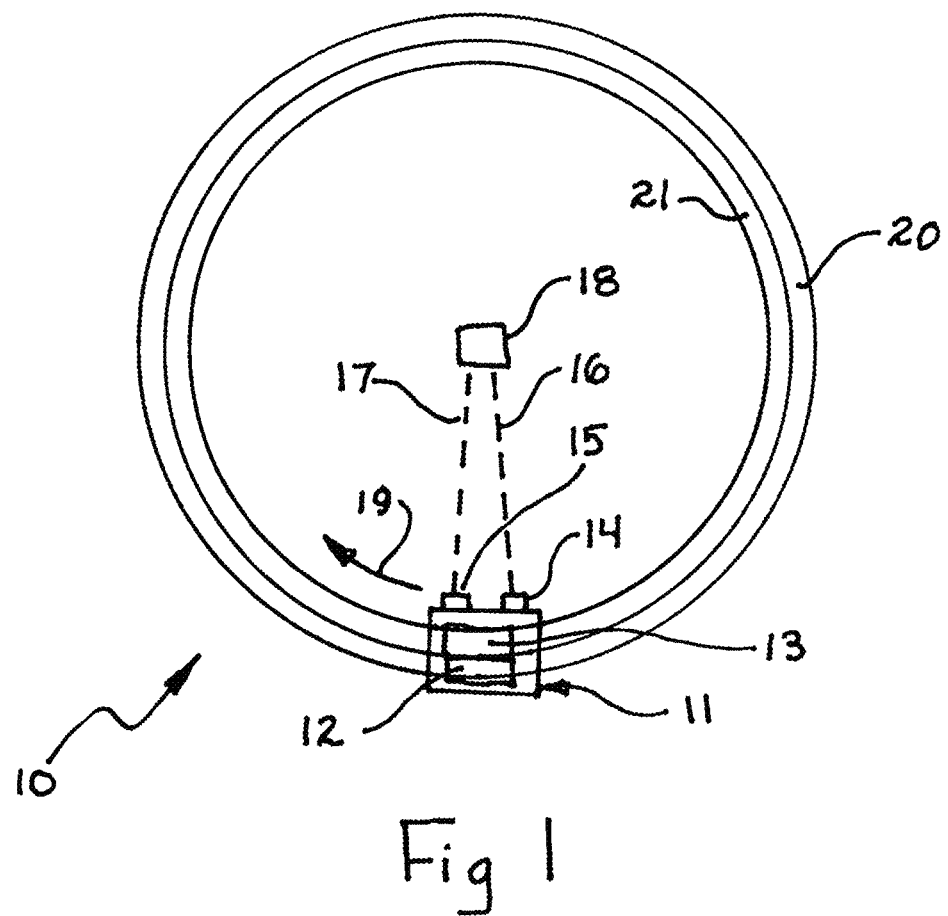
FIG. 1 sets forth a top view diagram of a construction apparatus constructed in accordance with the present invention fabricating an agricultural growing structure.

FIG. 1 sets forth a top view diagram of a construction apparatus constructed in accordance with the present invention generally referenced by numeral 10 fabricating an agricultural growing structure. An extruder support truck 11, set forth below in greater detail, supports a pair of trough extruders 12 and 13 (also set forth below in greater detail). Extruder support truck 11 further includes a pair of position sensors 14 and 15 which operate to control the travel path of extruder support truck 11. In the preferred fabrication of the present invention, extruder support truck 11 is controlled to travel in a circular path as indicated by arrow 19. In further accordance with the present invention, trough extruders 12 and 13 continuously extrude respective one-piece growing troughs 20 and 21. In accordance with the construction apparatus and method described below in greater detail, extruder truck 11 continuously travels on a controlled circular path simultaneously raising extruders 12 and 13 as it travels thereby forming successive helical tiers of growing troughs 20 and 21 until the desired height of the resulting helical troughs has been attained. During this process, a position controller 18 utilizing conventional laser positional control communicates with positions sensors 14 and 15 via control links 16 and 17 to precisely maintain the circular travel path of extruder support truck 11. Once helical growing troughs 20 and 21 have been fully fabricated, a conventional crane is utilized to lift extruder support truck 11 upwardly from the fabricated helical trough structure. Thereafter, extruder support truck 11 may be positioned inwardly or outwardly from helical troughs 20 and 21 and utilized to fabricate another set of concentric helical growing troughs.

Figure 2:
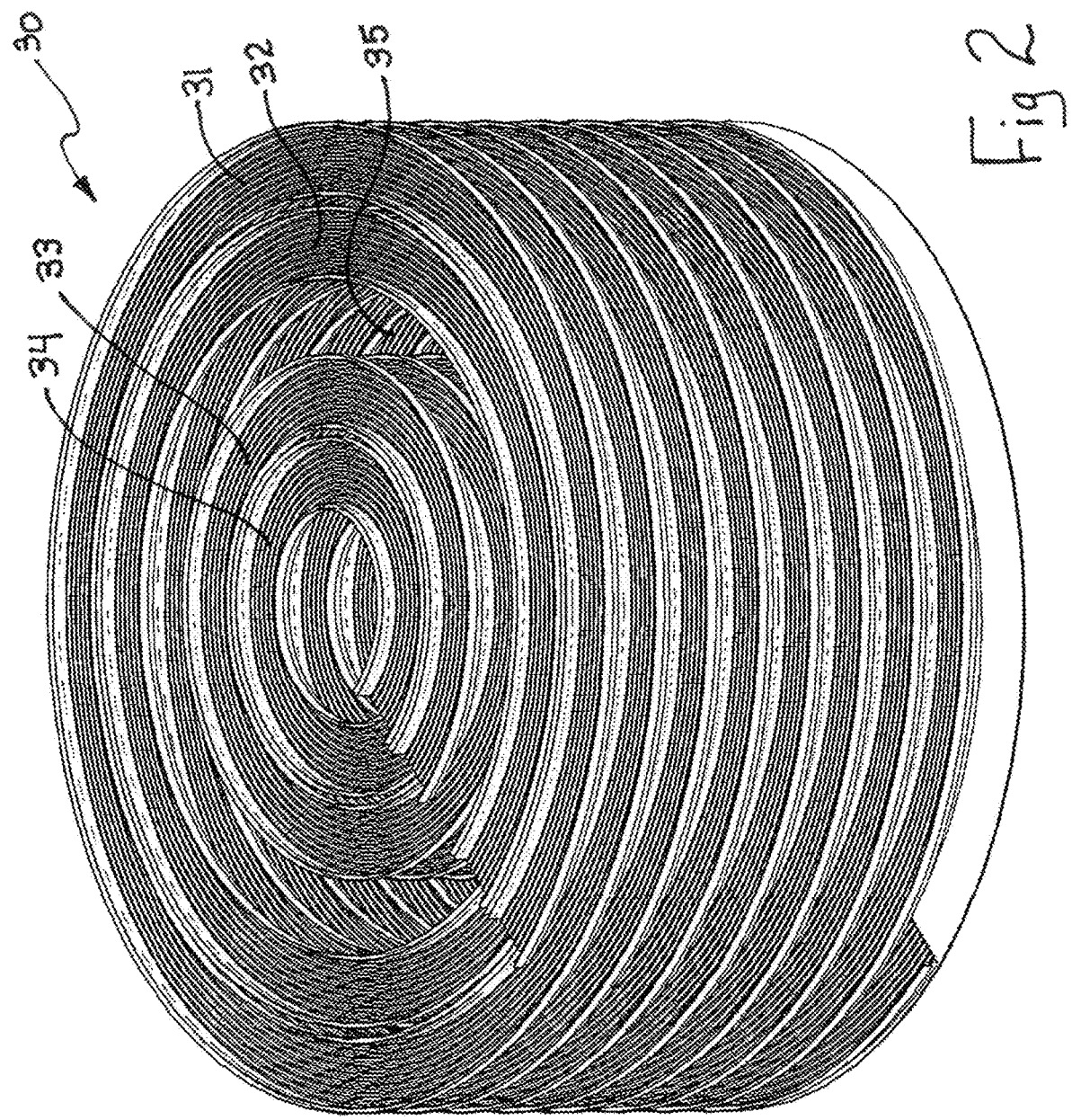
FIG. 2 sets forth a perspective view of a plurality of one-piece helical growing troughs constructed in accordance with the present invention construction apparatus and method for agricultural growing structure.

FIG. 2 sets forth a perspective view of a plurality of one-piece helical growing troughs constructed in accordance with the present invention and generally referenced by numeral 30. Helical growing troughs 30 comprise concentric pairs of helical troughs formed in the above described manner in which an extruder support truck 40 (set forth below in FIG. 3) supports a pair of extruders (seen in FIG. 5) on each side thereof. As a result, a first pair of concentric helical growing troughs 31 and 32 are formed on the outside of helical growing troughs 30 and a second pair of concentric helical growing troughs 33 and 34 are formed within helical troughs 31 and 32 separated therefrom by a space 35. Space 35 results from the position of extruder support truck 40 (seen in FIG. 3) being positioned between the extruder pairs on each side thereof. It will be apparent to those skilled in the art that the structure set forth in FIG. 2 showing four concentric helical troughs is provided for purposes of illustration and not limitation. It will be equally apparent to those skilled in the art that a substantially greater diameter structure may be utilized in a practical growing environment that will accommodate a greater number of helical troughs in a concentric arrangement.

Figure 3:
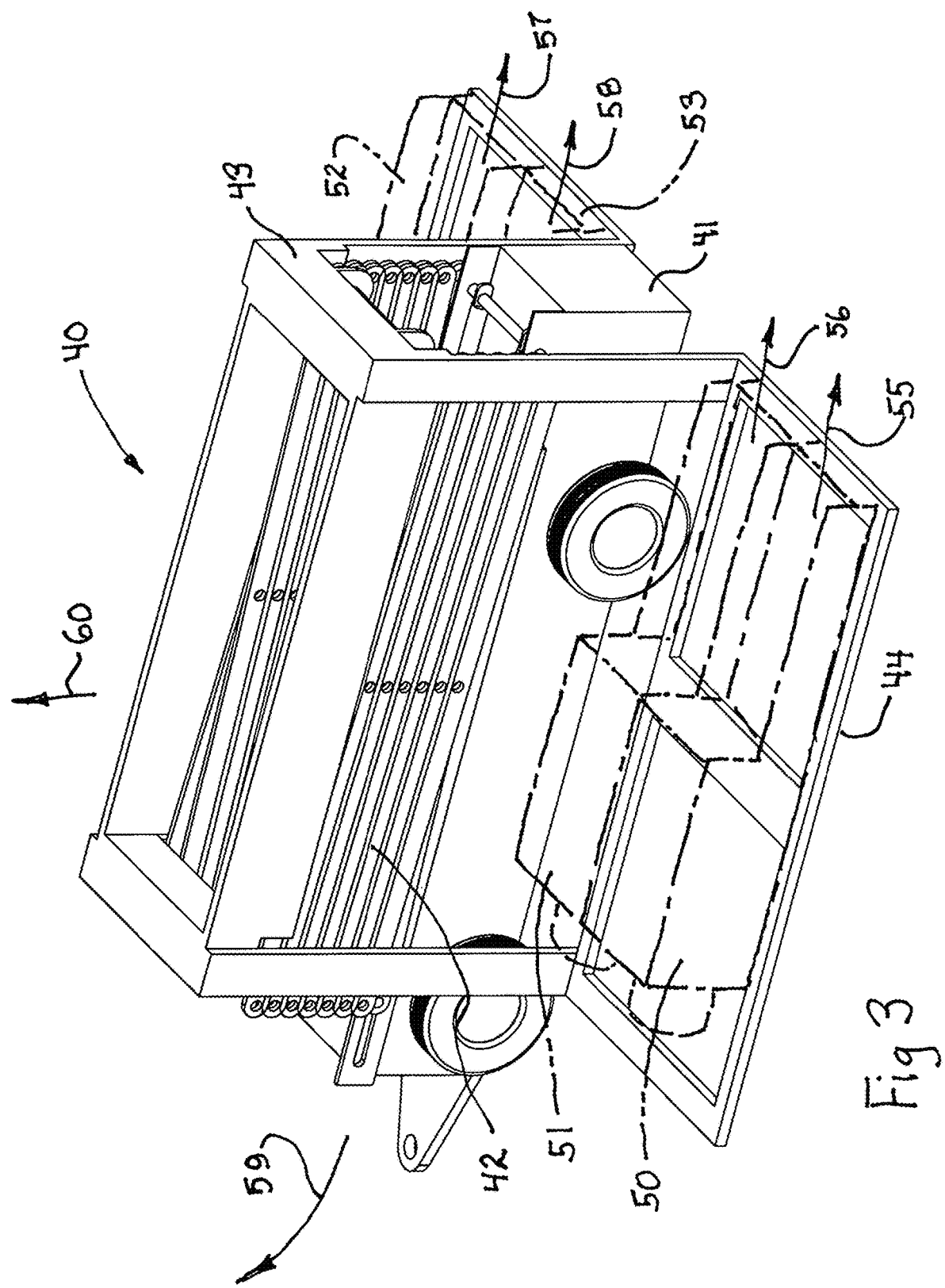
FIG. 3 sets forth a perspective view of an illustrative extruder support truck constructed in accordance with the present invention in its collapsed configuration.

FIG. 3 sets forth a perspective view of an illustrative extruder support truck constructed in accordance with the present invention and generally referenced by numeral 40. Extruder support truck 40 is shown in FIG. 3 in its collapsed configuration. Extruder support truck 40 is a self-contained self-propelled unit which includes a lift truck 41 having conventional drive apparatus (not shown) for driving lift truck 41 forwardly in the direction indicated by arrow 59 under its own power. For example, the drive unit for lift truck 41 may comprise a conventional electric battery powered transport apparatus, or the like. In addition, lift truck 41 includes direction control apparatus for steering the direction of travel of lift truck 41. The propulsion apparatus and steering apparatus within lift truck 41 operates under the control of a computer control system (not shown) of conventional design. Lift truck 41 further includes a scissors lift 42 fabricated in accordance with conventional fabrication techniques. Scissors lift 42 is shown in its collapsed configuration in FIG. 3. For comparison and with temporary reference to FIG. 4, scissors lift 42 is shown therein in its upwardly extended configuration. Scissors lift 42 will be understood to utilize conventional power drive apparatus (not shown) utilized in raising and lowering scissors lift 42.

Returning to FIG. 3, lift truck 41 further includes a frame 43 supported upon the upper end of scissors lift 42 and secured thereto by conventional attachment (not shown). Frame 43 includes an outwardly extending extruder platform 44 upon which a pair of trough extruders 50 and 51 are secured. Frame 43 further includes a second outwardly extending extruder platform 45 upon which a second pair of trough extruders 52 and 53 are secured. Extruders 50, 51, 52 and 53 are shown in phantom line depiction to represent that virtually any type of trough extruder may be utilized upon extruder platforms 44 and 45 without departing from the spirit and scope of the present invention. The essential function of trough extruders 50 through 53 includes processing a supply of suitable material, such as a resin or plastic material or the like, in granular or liquid form into a continuous extrusion having a cross-section shape corresponding to the one-piece growing troughs utilized in the present invention.

In operation, as lift truck 41 is caused to move forwardly along a circular path as indicated by arrow 59, extruders 50 through 53 are operated to form continuous trough extrusions which extend rearwardly from extruders 50 through 53 in the directions indicated by arrows 55 through 58 respectively. The circular travel path of lift truck 41 imparts the curved structure to the continuously extruded growing troughs. The final element of the trough extrusion process is provided as scissors lift 42 is activated to raise frame 43 upwardly in the direction indicated by arrow 60 during the circular path extrusion process. Accordingly, as lift truck 41 moves forwardly on its circular path and as extruders 50 through 53 produce continuously extruded growing troughs, the raising of scissors lift 42 and frame 43 raises extruders 50 through 53 to impart the helical shape to the extruded trough. In the preferred fabrication of the present invention, components of the trough supports fabricated in accordance with the above referenced incorporated co-pending applications are assembled behind extruder support truck 40 to provide support of the extruded troughs. This process continues through repeated circular travel paths as frame 43 is continuously raised and successively higher trough supports are assembled behind lift truck 41. Once the desired height of the helical troughs has been attained, the completed structure formed in accordance with the above referenced incorporated co-pending application is provided. As mentioned above, additional concentric growing troughs may be fabricated by lifting extruder support truck 40 from the helical trough structure and placing it next to the newly formed helical troughs. Thereafter, the process is repeated to form the additional concentric helical troughs.

Figure 4:
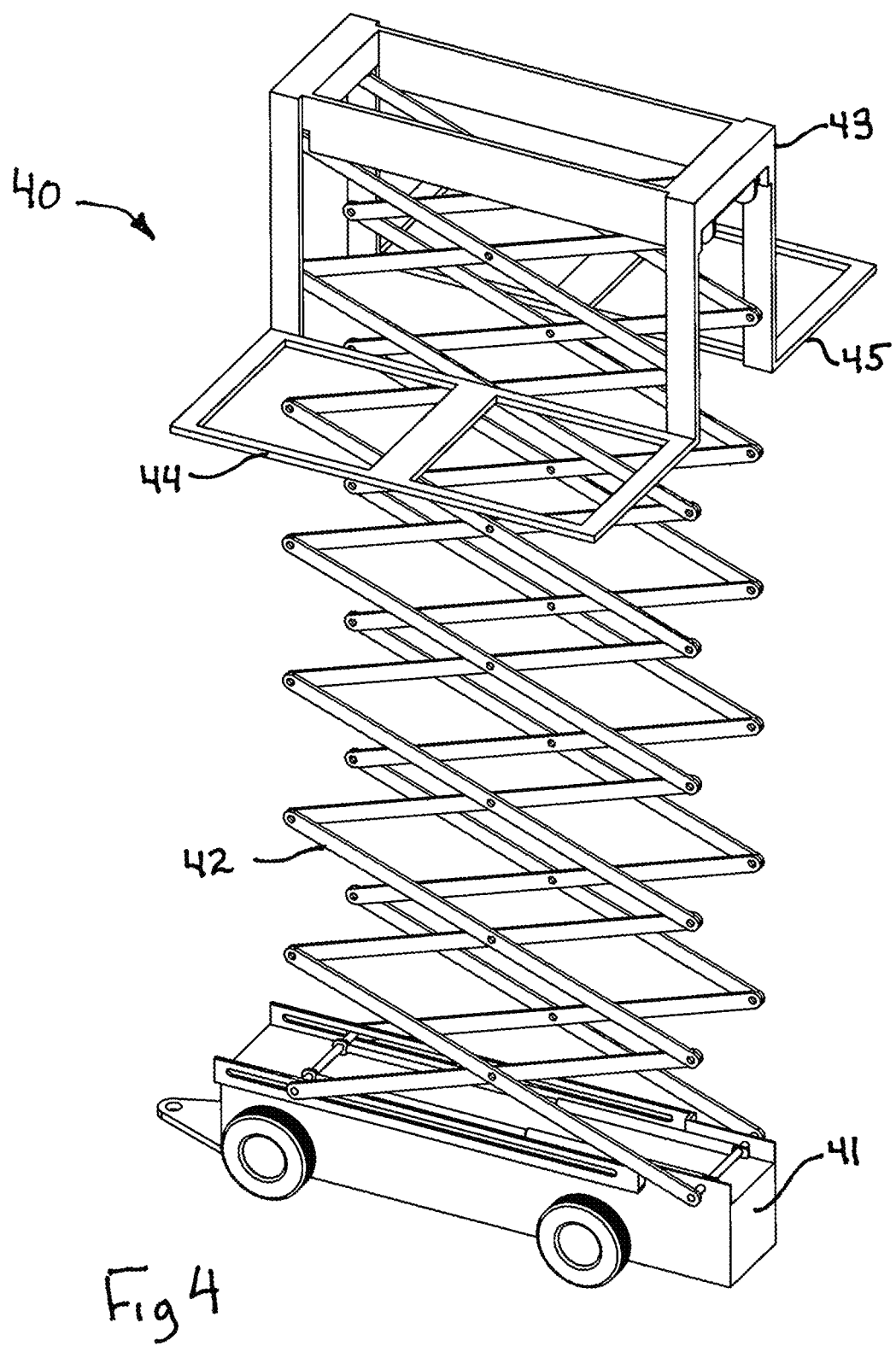
FIG. 4 sets forth a perspective view of the illustrative extruder support truck constructed in accordance with the present invention set forth in FIG. 3 in its extended configuration.

FIG. 4 sets forth a perspective view of extruder support truck 40 in its raised extended configuration. As described above, lift truck 41 includes a scissors lift 42 fabricated in accordance with conventional fabrication techniques shown in its upwardly extended configuration. It will be recalled that scissors lift 42 is understood to utilize conventional power drive apparatus (not shown) utilized in raising and lowering scissors lift 42. Lift truck 41 further includes a frame 43 supported upon the upper end of scissors lift 42 and secured thereto by conventional attachment (not shown). Frame 43 includes outwardly extending extruder platforms 44 and 45 upon which pairs of trough extruders (seen in FIG. 3) are secured.

Figure 5:
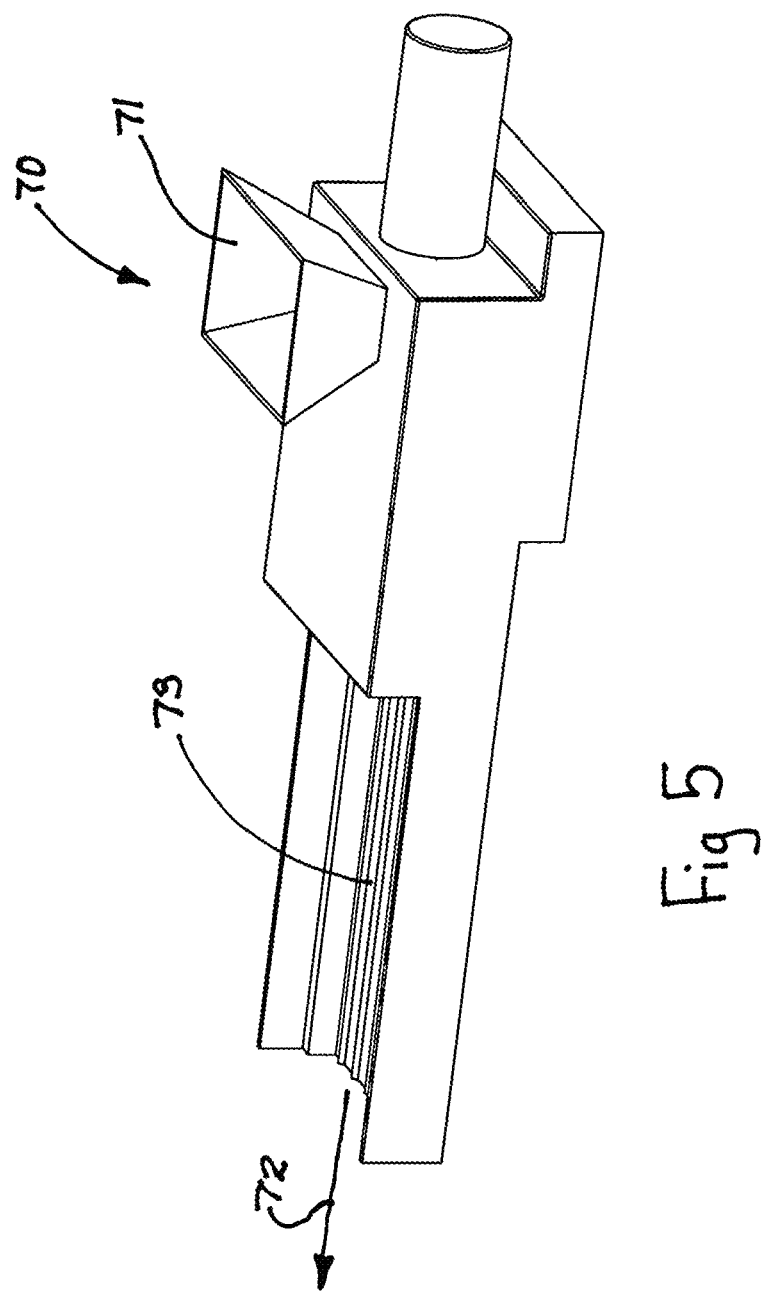
FIG. 5 sets forth a perspective view of an illustrative trough extruder utilized in fabricating an agricultural growing structure utilizing the present invention construction apparatus and method.

FIG. 5 sets forth a perspective view of an illustrative trough extruder generally referenced by numeral 70 for fabricating an agricultural growing structure utilizing the present invention construction apparatus and method. Extruder 70 is conventional in fabrication having a material input 71 and a extruded trough output 72. The operation of extruder 70 may be conventional in that a supply of material which alternatively may be granular or pelletized is supplied to input 71. Within extruder 70 the material is compressed and heated to flow through an internal extrusion die (not shown) in which the desired cross-sectional shape is imparted to the flowing material. The partially cooled and formed extrusion then passes outwardly in the direction indicated by arrow 72 across output tray 73 which aids in the maintenance of the desired extrusion shape as the cooling and setting process continues to form the trough. The advantage of utilizing on-site extrusion fabrication in forming the helical troughs of the inventive structure includes the capability of producing a one-piece helical extrusion having virtually any desired length.

Figure 6:
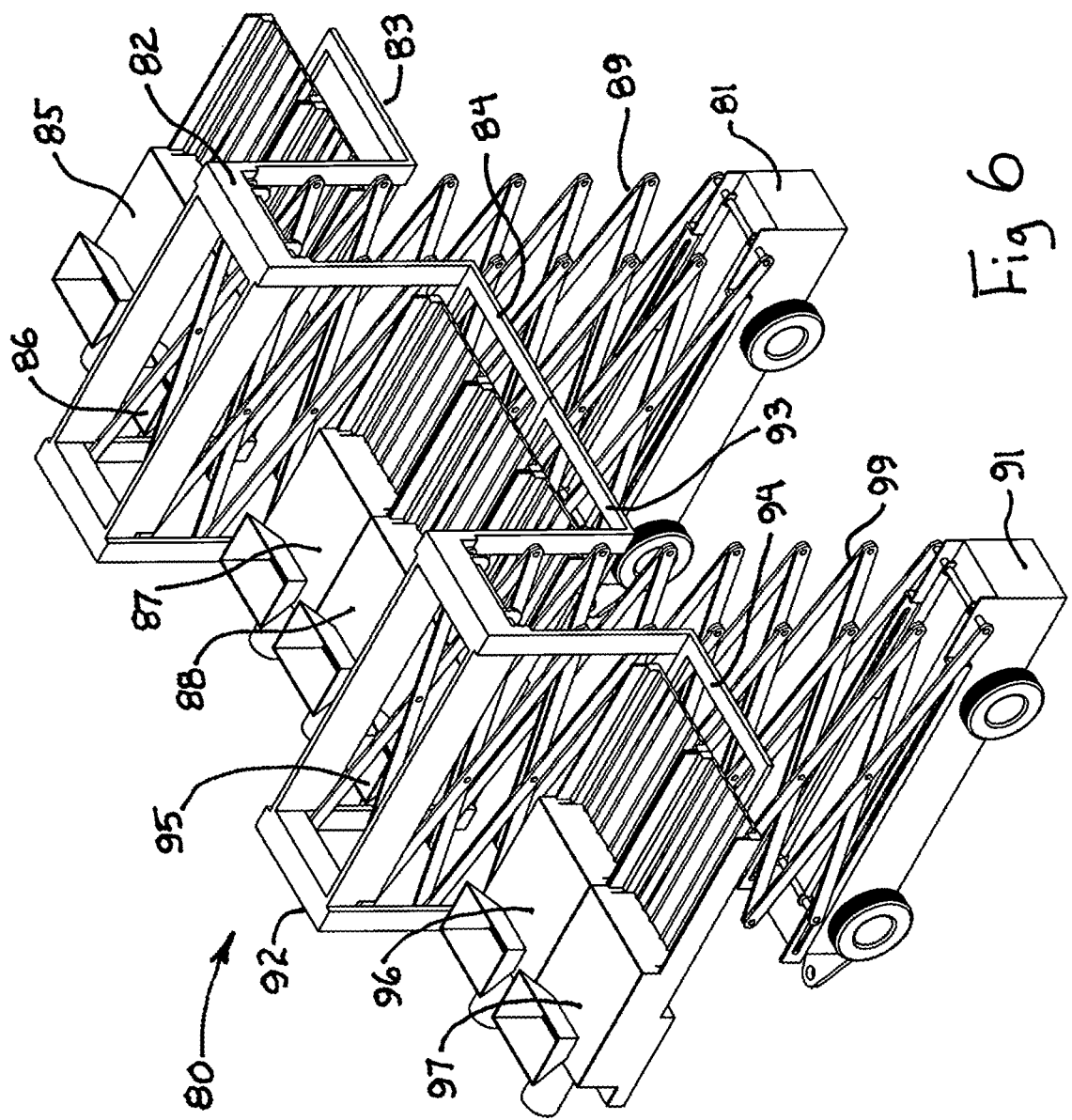
FIG. 6 sets forth a perspective view of a pair of illustrative extruder support trucks constructed in accordance with the present invention in their extended configurations arranged to cooperate in simultaneously fabricating six one piece extruded helical growing troughs.

FIG. 6 sets forth a perspective view of a compound extruder support truck generally referenced by numeral 80 which is formed of a pair of extruder support trucks operating together to simultaneously fabricate seven extruded helical troughs. Compound extruded truck support 80 includes a lift truck 81 supporting a scissor lift 89 which, in turn, supports a frame 82. Frame 82 includes a pair of outwardly extending platforms 83 and 84. A plurality of extruders 85, 86 and 87 are supported upon platforms 83 and 84 respectively. Compound extruded truck support 80 further includes a lift truck 91 supporting a scissor lift 99 which, in turn, supports a frame 92. Frame 92 includes a pair of outwardly extending platforms 93 and 94. A plurality of extruders 95, 96 and 97 are supported upon platforms 83 and 84 respectively. A seventh extruder 88 is supported between platforms 84 and 93 to provide a total of seven extruders to simultaneously produce seven extruded troughs.

Utilizing the present invention construction apparatus and method provides a plurality of continuous one-piece helical water troughs. As a result, potential leaks occurring in segmented helical troughs is avoided. In addition, it is believed that additional advantages such as reduced cost and labor will also be realized.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. Apparatus for forming a plurality of one-piece helical growing troughs for use in an agricultural growing structure, said apparatus comprising:
    a self-propelled lift truck capable of traveling a circular path;
    a scissors lift supported upon said lift truck configurable in a collapsed configuration and an upwardly extended raised configuration;
    a frame supported upon said scissors lift having an outwardly extending platform; and
    a plurality of trough extruders each forming a one piece extruded trough,
    said lift truck traveling in a circular path as said trough extruders extrude continuous one-piece extruded troughs and said scissors lift progressively raising said frame, said platform and said extruders to impart a helical shape to the extruded one piece troughs thus formed.

2. A method of forming a helical agricultural growing structure having a plurality of concentric helical growing troughs, said method comprising the steps of:
    providing a self-propelled lift truck capable of traveling a circular path;
    providing a scissors lift supported upon said lift truck configurable in a collapsed configuration and an upwardly extended raised configuration;
    providing a frame supported upon said scissors lift having an outwardly extending platform;
    providing a plurality of trough extruders each forming a one piece extruded trough;
    moving said lift truck in a circular path as said trough extruders extrude continuous one-piece extruded troughs; and
    extending said scissors lift progressively raising said frame, said platform and said extruders as said lift truck travels in said circular path to impart a helical shape to the extruded one piece troughs thus formed.

* * * * *